(12) United States Patent
Shukla et al.

(10) Patent No.: US 9,185,055 B2
(45) Date of Patent: Nov. 10, 2015

(54) COMMUNICATING NETWORK PATH AND STATUS INFORMATION IN MULTI-HOMED NETWORKS

(71) Applicant: Juniper Networks, Inc., Sunnyvale, CA (US)

(72) Inventors: Pankaj Shukla, San Jose, CA (US); Manish Gupta, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/082,928

(22) Filed: Nov. 18, 2013

(65) Prior Publication Data

US 2014/0078884 A1 Mar. 20, 2014

Related U.S. Application Data

(62) Division of application No. 12/772,771, filed on May 3, 2010, now Pat. No. 8,593,973.

(60) Provisional application No. 61/312,105, filed on Mar. 9, 2010.

(51) Int. Cl.
*H04L 12/939* (2013.01)
*H04L 12/26* (2006.01)
*H04L 12/707* (2013.01)
*H04L 12/24* (2006.01)

(52) U.S. Cl.
CPC .......... *H04L 49/557* (2013.01); *H04L 43/0811* (2013.01); *H04L 45/22* (2013.01); *H04L 45/24* (2013.01); *H04L 41/0663* (2013.01)

(58) Field of Classification Search
USPC ............... 370/241.1, 242, 248, 216, 217, 222
See application file for complete search history.

(56) References Cited

U.S. PATENT DOCUMENTS

| 7,020,150 | B2 | 3/2006 | Ho et al. |
| 7,644,317 | B1 | 1/2010 | Sajassi et al. |
| 2007/0086455 | A1 | 4/2007 | Allan et al. |

(Continued)

FOREIGN PATENT DOCUMENTS

| EP | 1956766 A1 | 8/2008 |
| EP | 2254276 A1 | 11/2010 |

OTHER PUBLICATIONS

IEEE Std. 802.1ag—2007, IEEE Computer Society, Dec. 17, 2007, pp. 185-206.*

(Continued)

*Primary Examiner* — Albert T Chou
(74) *Attorney, Agent, or Firm* — Shumaker & Sieffert, P.A.

(57) ABSTRACT

An example network system includes a layer two (L2) device and a layer three (L3) device. The L2 device includes a control unit is configured to determine a preferred network path from a first L2 network in which the L2 device resides to an intermediate L3 network in which the L3 device resides that couples the first L2 network to a second L2 network having a second L2 device. The control unit includes a management endpoint (MEP) module. The MEP module executes an operations, administration, and management (OAM) protocol to monitor the first L2 network and output an L2 frame in accordance with the OAM protocol to the L3 device to notify the L3 device that it is within the preferred network path. A MEP module of the L3 device executes an OAM protocol that outputs L2 frames to the L2 device indicating the status of the L3 network.

16 Claims, 8 Drawing Sheets

(56) References Cited

U.S. PATENT DOCUMENTS

| | | | |
|---|---|---|---|
| 2008/0112323 | A1 | 5/2008 | Agmon et al. |
| 2008/0225695 | A1 | 9/2008 | Balus et al. |
| 2009/0268746 | A1 | 10/2009 | Ogasahara et al. |
| 2010/0128728 | A1 | 5/2010 | Sun et al. |
| 2010/0165832 | A1 | 7/2010 | Kini et al. |
| 2010/0208593 | A1* | 8/2010 | Soon et al. .................... 370/242 |
| 2010/0238791 | A1* | 9/2010 | Duncan et al. ................ 370/216 |
| 2010/0315946 | A1* | 12/2010 | Salam et al. .................. 370/222 |

OTHER PUBLICATIONS

Dutta et al., "LDP Extensions for Optimized MAC Address Withdrawal in H-VPLS," L2VPN Working Group, Internet Draft, IETF Trust, Mar. 7, 2010, 17 pp.

Lasserre et al., "Virtual Private LAN Service (VPLS) Using Label Distribution Protocol (LDP) Signaling," Network Working Group, RFC 4762, IETF Trust, Jan. 2007, 31 pp.

Extended Search Report from counterpart European Application No. 14168041.3, dated Sep. 9, 2014, 11 pp.

Second Office Action from European counterpart application No. 10174840.8, dated Mar. 14, 2014, 5 pp.

K. Kompella et al., "Virtual Private LAN Service (VPLS) Using BGP for Auto-Discovery and Signaling," Network Working Group, Request for Comments: 4761, Jan. 2007, 27 pp.

J. Scudder et al., "Capabilities Advertisement with BGP-4," Network Working Group, Request for Comments: 5492, Feb. 2009, 7 pp.

A. Sajassi et al., "Customer MAC Address Flushing Mechanisms for Provider Backbone Bridging over VPLS," Internet Working Group, Internet Draft, Jul. 2008, 14 pp.

B. Kothari et al., "VPLS Flush in BGP-based Virtual Private LAN Service," Network Working Group, Internet-Draft, Oct. 27, 2008, 15 pp.

IEEE Computer Society, "IEEE Standard for Local and metropolitan area networks—Virtual Bridged Local Area Networks Amendment 5: Connectivity Fault Management," LAN/MAN Standards Committee, Dec. 17, 2007, 246 pp.

B. Kothari et al., "BGP based Multi-homing in Virtual Private LAN Service," L2VPN Working Group, Internet-Draft, Nov. 20, 2009, 20 pp.

International Telecommunication Union, "Series Y: Global Information Infrastructure, Internet Protocol Aspects and Next-Generation Networks, OAM functions and mechanisms for Ethernet based networks," Y. 1731, Feb. 2008, 82 pp.

Office communication from European patent application No. 10174840.8, dated Dec. 20, 2012, 4 pp.

Extended European Search Report for European application No. 10174840.8 dated May 30, 2011, p. 7.

Response to the Extended European Search Report filed with the European Patent Office Mar. 20, 2012 in corresponding EP Application No. 10174840.8, 26 pages.

Response filed Apr. 5, 2013 to the outstanding EP Communication dated Dec. 20, 2012 in corresponding EP Application No. 10174840.8, 13 pgs.

Translation and original Notification of the First Office Action mailed Apr. 23, 2013 in corresponding CN Application Serial No. 201010279217.2, 24 pgs.

Translation and original Notification of the Second Office Action mailed Oct. 21, 2013 in corresponding CN Application Serial No. 201010279217.2, 15 pgs.

Communication pursuant to Article 94(3) EPC dated Aug. 21, 2015 received in EP Counterpart Application No. 14168041.3, 4 pgs.

* cited by examiner

COMMUNICATING NETWORK PATH AND STATUS INFORMATION IN MULTI-HOMED NETWORKS

This application is a divisional of U.S. patent application Ser. No. 12/772,771, filed on May 3, 2010, which claims the benefit of U.S. Provisional Application No. 61/312,105 filed Mar. 9, 2010, the entire contents of both are incorporated by reference herein.

TECHNICAL FIELD

The invention relates to computer networks, and, more particularly, to fault detection and path selection within a computer network.

BACKGROUND

A computer network is a collection of interconnected computing devices that exchange data and share resources. The computing devices may be interconnected by one or more links. The term "link" is often used to refer to the connection between two devices on a network and may include a physical medium, such as a copper wire, a coaxial cable, or any of a host of different fiber optic lines, or a wireless connection. Often, in highly populated areas, the computer network includes links laid in the shape of a ring. When shaped in a ring, the network is referred to as a "ring network." A ring network in a highly populated area that implements a Layer Two (L2) Ethernet communications protocol may be referred to as a "metro Ethernet network."

In a typical configuration, a metro Ethernet network includes a plurality of interconnected metro termination units (MTUs) that provide access to the metro Ethernet network for computing devices referred to as customer subscriber devices. The computing devices couple to the MTUs to gain access to the metro Ethernet network and thereby interconnect with other computing devices coupled to the metro Ethernet network. One or more layer three (L3) provider edge (PE) routers may couple the metro Ethernet network with a public network, such as the Internet, or other private networks. Via the PE routers, computing devices may utilize the metro Ethernet network to access the public or private networks. The MTUs within the metro Ethernet network operate as layer two (L2) devices and typically learn L2 network addresses, e.g., Media Access Control (MAC) addresses, of various network devices as the MTUs forward L2 communications (e.g., Ethernet packets also referred to as Ethernet frames) associated with the network devices. Once learned, the MTUs store the learned MAC address information to more efficiently switch L2 communications within the Ethernet network. When the MTUs receive additional packets to direct to a network device with a learned MAC address, the MTUs look up the stored MAC address information and direct the packets to the network device based on the stored information.

Operations, Administration and Maintenance (OAM) generally refers to processes, activities, tools, standards and other techniques that involve operating, administering and maintaining, e.g., troubleshooting, a computer network. The combined OAM techniques may constitute an OAM protocol. An OAM protocol, such as Connectivity Fault Management (CFM) as described in the Institute of Electrical and Electronics Engineers (IEEE) 802.1ag standard, may include a number of proactive and diagnostic fault localization procedures. For example, a network device operating in accordance with CFM may proactively transmit continuity check (CC) messages at a predetermined rate to other devices within the same maintenance association, and receive CC messages from the devices. A maintenance association is a logical grouping of devices within the network configured to verify the integrity of a single service instance. A service instance may, for example, represent a portion of a provider network that a given customer can access to query a status of services delivered for that customer. The CC messages provide connectivity verification to the other network devices within the maintenance association.

Devices and/or links of the network may fail due to any of a number of reasons. When a device or link of the network fails, the result is typically a degradation or loss of service to particular customers, which is generally undesirable. An administrator of the network would therefore like to limit the duration of the failure. One conventional approach to mitigate the effects of failure of a PE router is to utilize a "multi-homed" architecture in which two or more redundant PE routers are used to couple the metro Ethernet network with the public network. In operation, the MTU coupled the two or more redundant PE routers selects one PE router as the preferred PE router and directs data packets to the public network through the preferred PE router. However, even though only one PE router is the preferred PE router, each PE router connected to the MTU typically reserves resources for processing data packets to and from the MTU.

When an MTU is multi-homed, a network error may exist within the public network connecting the preferred PE router and a network device outside the metro Ethernet network. Conventionally, the stored MAC address information must age out before the MTU will direct the network packets over a different network path that does not include the network error. That is, the MTU continues to direct packets over a network path that includes the network error until the stored MAC address information is purged, resulting in packet loss. To minimize the number of lost or dropped packets, the PE router may make the link between the PE router and the MTU unavailable by bringing down the link or "flapping" the link between the MTU and the PE router. The PE router may "flap" the link between the MTU and the PE router by issuing a series of messages in rapid succession to the MTU that alternate between indicating that the route is available and indicating that the route is not available to cause the MTU to flush the stored MAC address information. Using either of these techniques, data packets traveling over the link may be lost and the customer sending or receiving the data packets may be adversely affected. Further, services running on the same link but not affected by the network error may be disrupted by bringing down the link or by the link flapping.

SUMMARY

In general, techniques are described that enable notification of network events between a layer two (L2) network and a layer three (L3) network, which may improve the operation of network devices and minimize disruptions caused by network errors. The techniques may be particularly useful in multi-homed metro Ethernet networks. For example, the techniques may be applied where an L2 customer access device (e.g., an MTU) of a metro Ethernet network is multi-homed to two or more L3 PE routers that couple the metro Ethernet network to another network, such as a public network. In one example, the techniques may be applied using an OAM protocol executing on the MTUs and the PE routers, where the OAM protocol executing on each MTU and PE router sends periodic messages to other MTUs and PE routers to detect network errors and to communicate preferred routes.

In accordance with the techniques described herein, the MTUs and the PE routers may use an extended OAM protocol not only for connectivity checks and conventional network maintenance, but to also to transparently embed information with respect to triggering flushing of learned MAC address by the MTUs.

As another example, a multi-homed MTU coupled to an L3 network by multiple PE routers may utilize periodic OAM messages not only for connectivity checks and conventional network maintenance, but also to inform the PE routers as to which of the PE routers is currently selected by the MTU as the preferred PE router for providing connectivity to an external network, such as a public or private network. In this manner, in response to a network event leading to a change in selection, the non-preferred path PE routers coupled to the MTU may, for example, be informed of the change and in response automatically release network resources.

In another example operation, a PE router that couples a metro Ethernet network to a L3 network may detect a network error within the L3 network using a routing protocol such as the Border Gateway Protocol (BGP) or the Label Distribution Protocol (LDP). The PE router may communicate the network status to an MTU of the metro Ethernet network by transparently embedding the information in the periodic message of the OAM protocol otherwise used for connectivity checks. The MTU may then make path selection decisions based on the received network status information. For example, the MTU may change the preferred network path such that a second PE router, also coupled to the MTU, is now included in the preferred network path, and such that the first PE router, which was originally in the preferred network path, is no longer within the preferred network path. The MTU may communicate the changed network path preferences to each PE router via the periodic messages.

In another example operation, a PE router directs an MTU to flush one or more MAC addresses learned over a link to the PE router using the periodic message of the OAM protocol. The PE router may command the MTU to flush the MAC addresses in response to detecting a network error in the public network or in response to learning that the PE router is no longer within the preferred network path, for example. In this manner, the PE router can avoid flapping the link, and the associated traffic loss by services operating over the same link, but not affected by the network error, may be prevented. In the above examples, the periodic messages may be continuity check (CC) messages, and the additional network information may be included as type-length-values (TLVs) of the CC messages.

In one example, a method includes executing, on a first network device, an operations, administration, and management (OAM) protocol to monitor a first layer two (L2) network, wherein the first network device operates within the first L2 network. The method further includes determining that a network path to a second network device via a third network device is a preferred network path, wherein the second network device operates in a second L2 network, wherein the second L2 network is different than the first L2 network, and wherein the first and second L2 networks are coupled by a layer three (L3) network, and issuing, with the OAM protocol executing on the first network device, a message to the third network device, wherein the message notifies the third network device that the third network device is within the preferred network path, and wherein the third network device couples the first L2 network with the L3 network.

In another example, a network device includes a plurality of physical network interfaces for sending and receiving packets and a control unit configured to determine a preferred network path to a second network device. The control unit includes a management endpoint (MEP) module configured to execute an operations, administration, and management (OAM) protocol to monitor a first layer two (L2) network, generate a message with the OAM protocol, and send the message via one of the plurality of physical network interfaces to a third network device, wherein the message indicates to the third network device that the third network device is within the preferred network path to the second network device, wherein the network device operates in the first L2 network, wherein the second network device operates in a second L2 network, wherein the first and second L2 networks are different L2 networks, wherein a layer three (L3) network couples the first and second L2 networks, and wherein the third network device couples the first L2 network to the L3 network.

In another example, a system includes a first network device and a second network device. The first network device includes a first plurality of physical network interfaces, and a first control unit. The first control unit comprises a first management endpoint (MEP) module, and a media access control (MAC) address repository configured to store MAC addresses learned over a plurality of links coupled to the plurality of physical network interfaces. The second network device comprises a second plurality of physical network interfaces, and a second control unit. The second control unit comprises a second MEP module, and a routing engine, wherein the routing engine is configured to execute one or more routing protocols. The first control unit is configured to determine a preferred network path to a third network device. The first MEP module is configured to execute an operations, administration, and management (OAM) protocol to monitor a first layer two (L2) network, generate a message with the OAM protocol, and send the message via one of the plurality of physical network interfaces to the second network device, wherein the message indicates to the second network device that the second network device is within the preferred network path to the third network device. The third network device operates in a second L2 network, wherein the second L2 network is different from the first L2 network, wherein the first and second L2 networks are coupled with a layer three (L3) network. The second MEP module is configured to execute an OAM protocol to monitor the first L2 network and analyze the first message received from the first network device to determine if the second network device is within the preferred path to the third network device. The second control unit is configured to allocate resources available to the second network device based on whether the second network device is within the preferred network path.

In another example, a computer-readable storage medium is encoded with instructions for causing one or more programmable processors to determine that a network path from a first network device to a second network device via a third network device is a preferred network path using an operations, administration, and management (OAM) protocol, wherein the first network device operates within a first L2 network, wherein the third network device operates in a second L2 network, wherein the second L2 network is different from the first network device, and wherein the L2 networks are coupled via a layer three (L3) network, and issue a message to the second network device indicating that the third network device is within the preferred network path.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
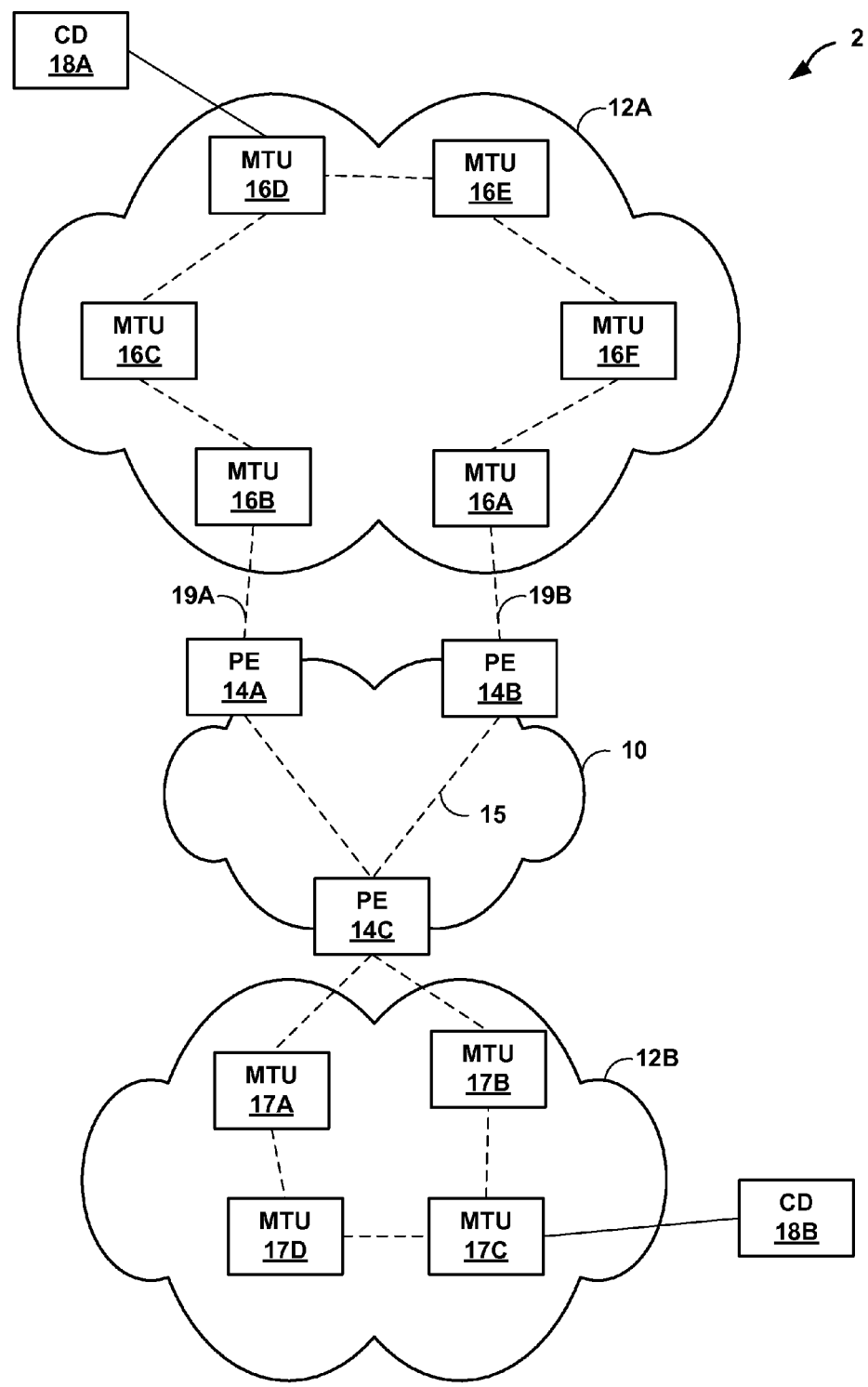
FIG. 1 is a block diagram illustrating an example multi-homed metro Ethernet network.

FIG. 1 is a block diagram illustrating a system 2 that includes an example multi-homed metro Ethernet ("ME") network 12A coupled to a network 10 via links 19A and 19B and provider edge ("PE") routers 14A and 14B. Network 10 is further coupled to a second ME network 12B via PE router 14C. PE routers 14A-14C (collectively, "PE routers 14") facilitate the access of content between various network devices connected to ME networks 12A and 12B (collectively, "ME networks 12"), such as customer devices ("CD") 18A and 18B (collectively, "CDs 18"). CDs 18 may each be a personal computer, a laptop computer, a mobile telephone, a network telephone, a televisions set-top box, a video game system, a point-of-sale device, a personal digital assistant, an intermediate network device, a network applicant, or another type of device capable of interfacing with and communication over ME networks 12. In addition, CDs 18 may each be gateway, router, switch or other device for coupling a customer network to ME networks 12.

Network 10 may be an intermediate layer three (L3) network that enables transmission of content between network devices using one or more packet-based protocols, such as an Internet Protocol/Transmission Control Protocol (IP/TCP). In this respect, network 10 may support the transmission of data via discrete data units, often referred to as "packets." As a result, network 10 may be referred to as a "packet-based" or "packet switched" network. ME networks 12 may support the transmission of data via layer two (L2) frames, e.g., Ethernet frames. As a result, each of ME networks 12 may each be referred to as an Ethernet network or more generally as an L2 network. While described in this disclosure as transmitting, conveying, or otherwise supporting packets, e.g., network 10, and frames, e.g., ME networks 12, network 10 and ME networks 12 may each transmit data according to any other discrete data unit defined by any other protocol, such as a cell defined by the Asynchronous Transfer Mode (ATM) protocol, or a datagram defined by the User Datagram Protocol (UDP).

Network 10 may represent a public network that is owned and operated by one or more service providers to interconnect a plurality of edge networks, such as ME networks 12. As a result, network 10 may be referred to herein as a Service Provider (SP) network or, alternatively, as a "core network" in that network 10 acts as a core to interconnect edge networks, such as ME networks 12. Routing and packet forwarding within network 10 may operate in accordance with L3 network routing protocols, such as Border Gateway Protocol (BGP), or the Label Distribution Protocol (LDP), which is sometimes referred to as a layer 2.5 protocol. ME networks 12 may operate using L2 network protocols, such as Ethernet. Reference to "layers" followed by a number may refer to a particular layer of the Open Systems Interconnection (OSI) reference model.

Network 10 may include a plurality of PE routers 14 that reside at an edge of service provider network 10. While discussed herein with respect to a particular network device, i.e., a router, PE routers 14 may each represent any L3 network device that interfaces with a network, such as one of ME networks 12, to route network traffic directed to or originating from network 10 and ME networks 12. For example, PE routers 14 may each represent, in certain instances, one or more of a router, a gateway, a firewall, an intrusion detection/prevention (IDP) device, or any other type of L3 network equipment that facilitates the transfer of data within network 10 and between network 10 and ME networks 12.

In the example of FIG. 1, ME network 12A includes metro termination units (MTUs) 16A-16F (collectively, "MTUs 16") and ME network 12B includes MTUs 17A-17D (collectively, "MTUs 17"). Like PE routers 14, MTUs 16, 17, while discussed herein with respect to a particular network device, e.g., a switch, may each represent any L2 network device that interfaces with a network, such as ME networks 12, to switch, or otherwise forward network traffic directed to or originating from the network. For example, MTUs 16, 17 may each represent, in certain instances, one or more of a switch, a hub, a firewall, an IDP device, or any other type of L2 network equipment that facilitates the transfer of data within ME networks 12 and between ME networks 12 and PE routers 14.

To facilitate maintenance of the interconnection of network 10 and ME networks 12, one or more of PE routers 14 and one or more of MTUs 16, 17 may implement Operations, Administration, and Maintenance (OAM) techniques, such as Connectivity Fault Management (CFM) as described in the IEEE 802.1ag standard. CFM generally enables discovery and verification of a path, through network devices and networks, taken by data units, e.g., frames or packets, addressed to and from specified network users, e.g., ME networks 12. Typically, CFM is directed to fault management within L2 networks, such as Ethernet networks, otherwise referred to as Large Area Networks (LANs), and L2 services, such as Virtual Private LAN Service (VPLS). While described herein with respect to L2 networks and services and CFM, the techniques may be employed to facilitate simultaneous execution of sessions for maintenance and operation management for networks and services provided with respect to other layers of the OSI reference model.

CFM generally provides a set of protocols by which to perform fault management. One protocol of the CFM set of protocols, referred to as a "continuity check protocol," involves a periodic transmission of messages to determine, verify or otherwise check continuity between two endpoints. More information regarding the 802.1ag standard and CFM set of protocols, including the continuity check protocol, can be found in an Institute of Electrical and Electronics Engineers (IEEE) draft standard, titled "IEEE Standard for Local and metropolitan area networks—Virtual Bridged Local Area Networks—Amendment 5: Connectivity Fault Management," by the LAN/MAN Standards Committee, dated Dec. 17, 2007, herein incorporated by reference in its entirety.

In accordance with CFM, one or more users or administrators of customer networks 14 may configure a Maintenance association End Point (MEP) within each one of MTUs 16 and PE routers 14A, 14B. Each of MTUs 16 and PE routers 14A, 14B may be configured with one or more MEPs, one for each of a plurality of service instances. MEPs may each represent an actively managed CFM entity that generates and receives Continuity Check (CC) message protocol data units (PDU) and tracks any responses. The administrator may, when configuring MEPs, associate MEPs with a particular service instance to verify the integrity of a single service instance. Each service instance may correspond to a particular customer and/or a particular virtual local area network (VLAN).

Each MEP may periodically transmit a continuity check (CC) message announcing the service instance of the transmitting one of MEPs. In one example, a CC message is a layer two frame, e.g., an Ethernet frame, and, more specifically, an Ethernet OAM frame. MEPs may multicast this message to each of MEPs included within the same service instance. A MEP thus learns one or more MEPs with which it expects to exchange, e.g., transmit and receive, CC messages. MEPs may then proceed to exchange CC messages according to each MEP's configuration. MEPs may execute the continuity check protocol to automatically exchange these CC messages according to a configured or, in some instances, set period, e.g., without any administrator or other user oversight after the initial configuration.

In accordance with the techniques of this disclosure, ME network 12A having MTUs 16 configured with one or more MEPs may have redundant physical connectivity to network 10 through multiple PE routers 14, a technique referred to as "multi-homing." As shown by the example illustrated in FIG. 1, ME network 12A is multi-homed to network 10 through MTUs 16A, 16B and PE routers 14A, 14B. In multi-homing, an MTU 16 chooses one of PE routers 14A, 14B as being within a preferred network path to network 10. The one of PE routers 14A, 14B within the preferred network path sends traffic back and forth between ME network 12A and network 10 via the one of MTUs 16A, 16B within the preferred network path. The other one of PE routers 14A, 14B that is not within the preferred path is the backup forwarder that can be used to send traffic to and from ME network 12A in the event of a network failure that would preclude the other one of PE routers 14A, 14B from sending the traffic.

MTUs 16 may choose the preferred network path in any number of ways including, as examples, at random, in response to a network condition such as a network error, or based on configuration parameters entered by an administrator. If, for example, MTU 16A selects the network path that includes PE router 14A as the preferred network path for reaching network 10, in accordance with the techniques described herein, MTU 16A may notify PE router 14A that PE router 14A is within the preferred path. In one embodiment, the corresponding MEP of MTU 16A generates and sends CC messages that are extended to include an additional type-length-value (TLV) to PE router 14A as part of executing the continuity check protocol. The additional TLV notifies PE router 14A that PE router 14A is within the preferred network path for reaching the multi-homed L3 network. Because PE router 14A is within the preferred network path, PE router 14B is not within the preferred network path. In one embodiment, the corresponding MEP of MTU 16A generates and sends CC messages to PE router 14B, but does not include the TLV that notified PE router 14A that PE router 14A is within the preferred network path.

In another embodiment, the corresponding MEP of MTU 16A generates CC messages that are extended to include an additional TLV that notifies each recipient PE router whether or not the PE router is within the preferred path by setting the value of the value field in the TLV to either zero or one, for example. The value zero may indicate to the PE router that the PE router is not within the preferred path and the value one may indicate to the PE router that the PE router is within the preferred path. In this manner, PE router 14A and 14B are each informed whether or not each is within the preferred network path and each may adjust its allocation of available resources accordingly. By extending the CC message to include an additional TLV, in addition to conventional continuity checks, an L2 device may utilize the CC message to transparently communicate, to an L3 device that provides connectivity to an L3 network, that the L3 device is on a preferred path to the L3 network.

PE routers 14A and 14B communicate with PE router 14C via network 10 using network protocols, such as Border Gateway Protocol (BGP), and the Label Distribution Protocol (LDP), for example. If PE router 14A detects a problem with connectivity in network 10 using, for example, Multiprotocol Label Switching (MPLS) based procedures or if PE router 14A receives notification of a network problem via network protocols, e.g., BPG or LDP, PE router 14A may notify MTU 16A of the connectivity problem using a TLV of a CC message generated by the MEP operating as part of the service instance that includes MTU 16A. That is, a layer three device, e.g., PE router 14A, notifies a layer two device, e.g., MTU 16A, operating in a layer two network, e.g., ME network 12A, of an error in the L3 network, e.g., network 10, using an L2 protocol, e.g., the CFM protocol. Upon receiving the notification CC message, MTU 16A may change the preferred network path for some or all network traffic being forwarded through PE router 14A. If MTU 16A changes its preferred path, MTU 16A may notify PE routers 14A and 14B of the changed preferred path via CC messages as discussed above.

As MTU 16A exchanges packets within ME network 12A and with PE routers 14A, 14B, MTU 16A learns remote MAC addresses over links 19A, 19B that connect MTU 16A to PE routers 14A, 14B, e.g., a MAC address of CD 18B. If, for example, an initial preferred network path includes link 19A and PE router 14A and PE router 14A detects an error in network 10, the MEP executing on PE router 14A that is associated with the particular service instance affected by the error in network 10 generates and sends a CC message to MTU 16A, which, in accordance to the techniques described herein, is extended to include TLVs used to notify MTU 16A of the network error and to indicate that MTU 16A is to flush all of the MAC addresses learned over link 19A. MTU 16A may then select a new preferred network path that, for example, includes link 19B and PE router 14B. Upon selecting the new preferred network path, MTU 16A newly learns remote MAC addresses over link 19B. In this manner, a layer three device in a layer three network communicates to a layer two device that one or more service instances executing on the layer two device are affected by a network error in the layer three network and causes the layer two device to update network path information for the affected service instances without affecting other service instances that exchange packets over the same physical link between the layer two and layer three devices.

Figure 2:
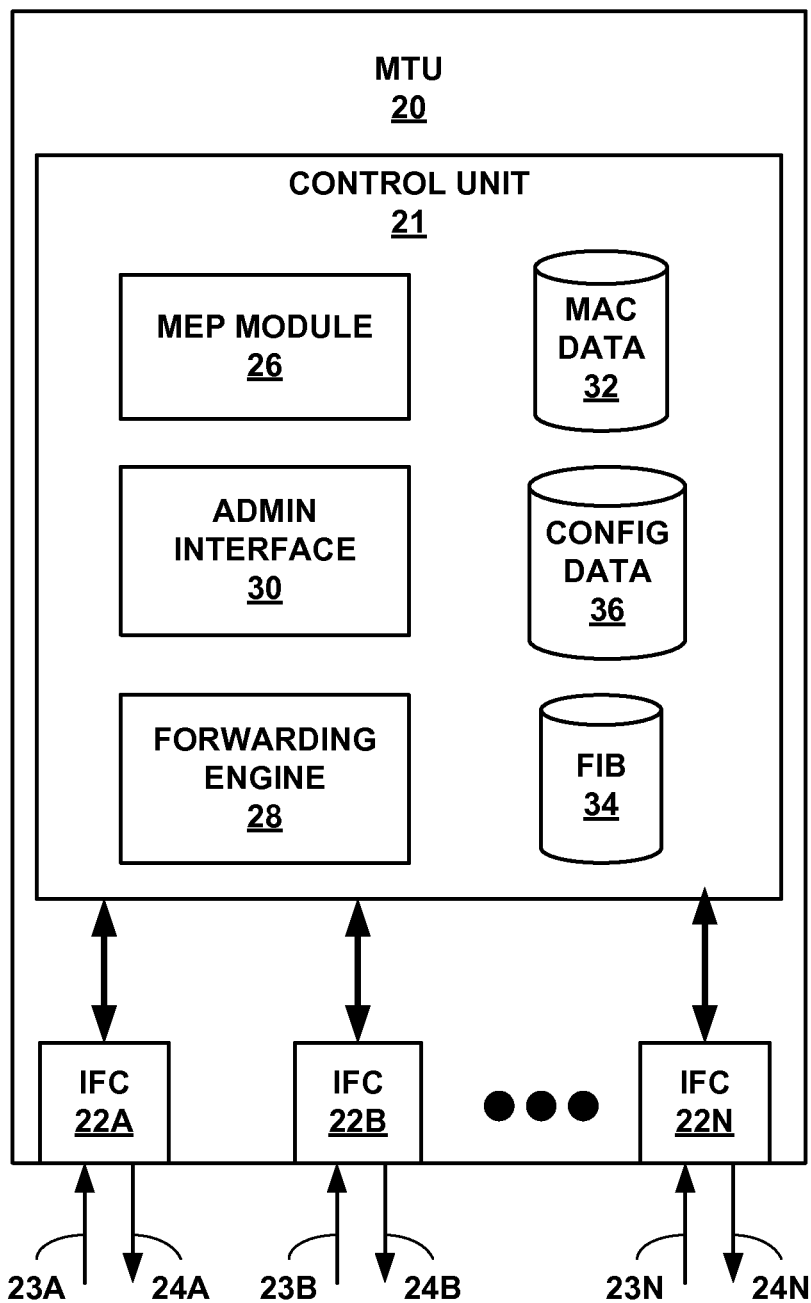
FIG. 2 is a block diagram illustrating an example metro termination unit (MTU) that implements techniques described in this disclosure.

FIG. 2 is a block diagram illustrating an exemplary MTU 20 that may implement the techniques described in this disclosure. For purposes of illustration, MTU 20 may be described below within the context of exemplary ME network 12A of FIG. 1 and may represent any one of MTUs 16, 17. MTU 20 includes network interface cards 22A-22N (collectively, "IFCs 22") that receive control packets and data packets via inbound links 23A-23N (collectively, "inbound links 23") and send control packets and data packets via outbound links 24A-24N (collectively, "outbound links 24"). The letter "N" is used herein to represent an arbitrary number of devices. IFCs 22 are typically coupled to links 23, 24 via a number of interface ports (not shown).

Control unit 21 may include one or more processors (not shown in FIG. 2) that execute software instructions, such as those used to define a software or computer program, stored to a computer-readable storage medium (not shown in FIG. 2). Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 20 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 21 provides an operating environment for MEP module 26, forwarding engine 28, and administrator interface ("ADMIN INERFACE") 30. Control unit 21 also provides a repository for MAC addresses ("MAC DATA") 32, forwarding information base ("FIB") 34, and configuration data ("CONFIG DATA") 36. MEP module 26 provides functionality to allow MTU 20 to operate as a management endpoint, e.g., in accordance with the 802.1ag standard. More generally, MEP module 26 is an instance of one or more OAM protocols executing within control unit 21.

In general, forwarding engine 28 inspects packets received via one of inbound links 23 and IFCs 22 to determine the destination of the packet, e.g., based on header information of the packet that includes the address of the destination. Forwarding engine 28 performs a lookup within FIB 34 based on the packet's header information to determine one of IFCs 22 and outbound links 24 to which to direct the packet. As MTU 20 sends and receives packets, control unit 21 learns remote MAC addresses over inbound links 23 and stores the MAC addresses in MAC data 32. MAC data 32, FIB 34, and configuration data 36 may be stored in individual data structures or together in one data structure and may be stored in the form of one or more tables, databases, linked lists, radix trees, or other suitable data structure.

An operator interacts with administrator interface 30 to direct MEP module 26 to perform CFM operations to discover and manage faults within a network, to issue CC messages to other network devices within a service instance, and to notify other network devices of network path information, including preferred path information, in accordance with the techniques of this disclosure. For example, an administrator may enter commands to view and modify configuration data 36 to automatically generate CC messages at specified time intervals, e.g., once every second or once per minute, as defined in the 802.1ag standard. The current configuration of MTU 20 is contained within configuration data 36.

MEP module 26 may manage MEP functionality for MTU 20 in its role as a MEP in one or a plurality of service instances. MEP module 26 examines received CC messages and generates and sends CC messages in accordance with configuration data 36, i.e., at configurable intervals and to particular ones of MTUs and PE routers associated with a particular service instance. For example, MEP module 26 may examine a received CC message and determine that the received CC message includes a TLV corresponding to a network status notification from PE router 14A. The network status TLV indicates that a particular network status exists within the network path for packets associated with the service instance corresponding to the particular service instance identified in the received CC message. The network status TLV may indicate that the network segment is not forwarding, that the network segment is in a standby state, or that there is a remote network segment failure. For example, MTU 20 may receive a CC message from PE router 14A that includes a network status TLV indicating that a link 15 between PE router 14B and PE router 14C is not forwarding. In response to receiving a CC message from a PE router indicating a network error in the core network, e.g., network 10, of FIG. 1, MTU 20 may change the preferred network path to direct packets around the network error.

If MTU 20 changes the preferred network path, whether arbitrarily, in response to learning of a particular network status, or for some other reason, MEP module 26 generates and sends CC messages extended to include a TLV that notifies the recipient PE routers whether or not the recipient PE routers are within the updated preferred network path. If a PE router was in the initial preferred network path, but is not within the updated preferred network path, the PE router may reallocate available resources by, for example, releasing resources previously reserved for processing the packets directed along the initial network path that are now directed along the updated preferred network path.

In another example, MTU 20 may receive a CC message from a PE router, e.g., PE router 14A, that instructs MTU 20 to flush a set of MAC addresses stored in MAC data 32. In this example, MEP module 26 examines the CC message received from the PE router and determines that the CC message includes a TLV indicating one or more MAC addresses MTU 20 is to flush from MAC data 32. MEP module 26 determines, for example, that the TLV includes a value field set to a value corresponding to a particular virtual local area network (VLAN) identifier, a particular I-SID (Service Instance VLAN ID), a particular MAC addresses, or a value indicating to MTU 20 that MTU 20 is to flush all learned MAC addresses. After determining which MAC addresses are specified in the CC message TLV, control unit 21 flushes the specified MAC addresses from MAC data 32.

Figure 3:
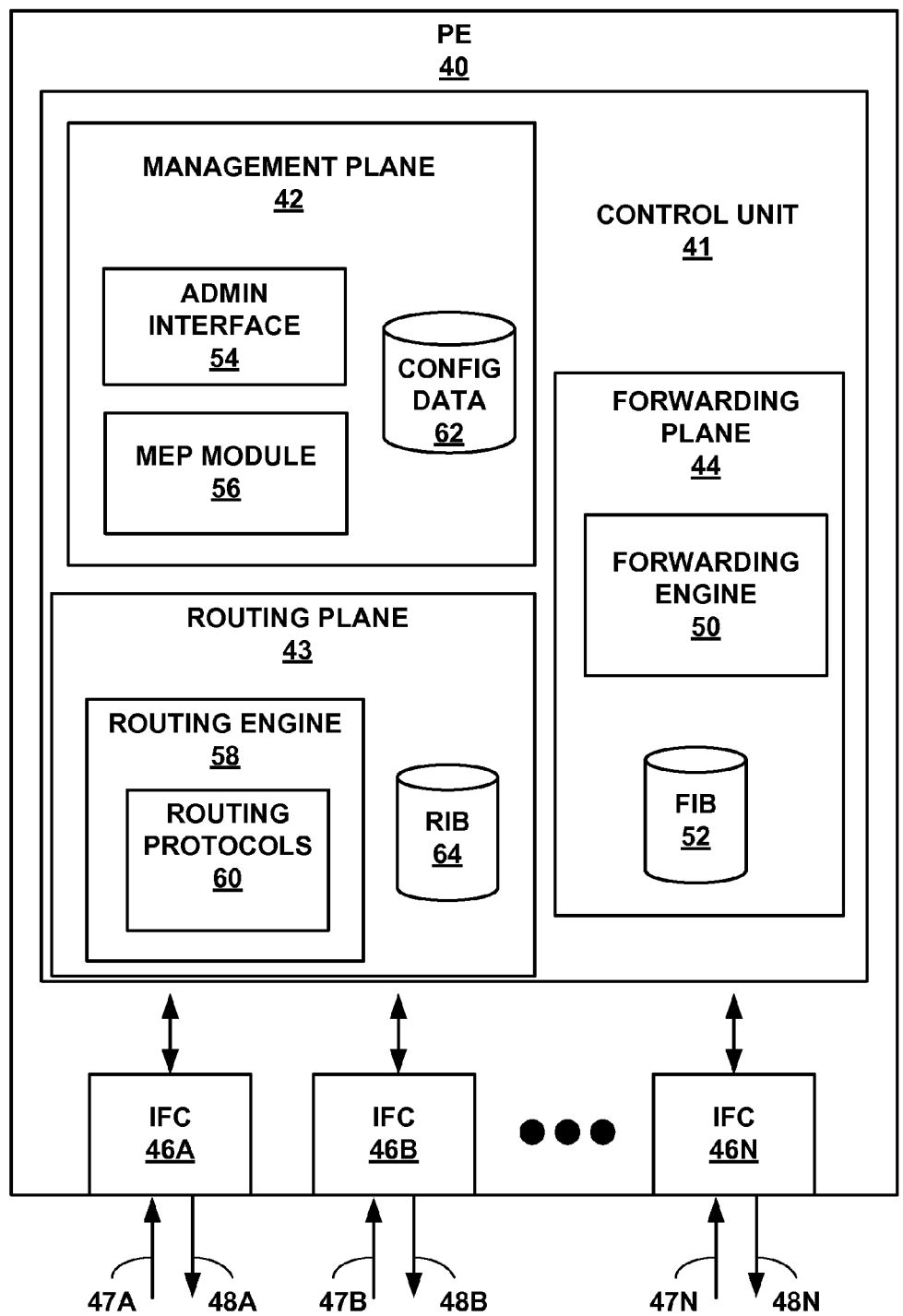
FIG. 3 is a block diagram illustrating an example provider edge (PE) router that implements techniques described in this disclosure.

FIG. 3 is a block diagram illustrating an exemplary PE router 40 that may implement the techniques in this disclosure. For purposes of illustration, PE router 40 may be described below within the context of exemplary network 10 and ME network 12 of FIG. 1 and may represent any one of PE routers 14. PE router 40 includes network interface cards 46A-46N (collectively, "IFCs 46") that receive control packets and data packets via inbound links 47A-47N (collectively, "inbound links 47") and send control packets and data packets via outbound links 48A-48N (collectively, "outbound links 48"). IFCs 46 are typically coupled to links 47, 48 via a number of interface ports.

Control unit 41 may include one or more processors (not shown in FIG. 3) that execute software instructions, such as those used to define a software or computer program, stored to a computer-readable storage medium (not shown in FIG.

3). Examples of computer-readable storage media include a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, or in addition, control unit 41 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 41 may be logically separated into management plane 42, routing plane 43, and forwarding plane 44. In this example, forwarding plane 44 may include any combination of hardware and/or software, which performs forwarding functions of the PE router 40, such as packet validation, route lookup, and delivery. In some examples, forwarding plane 44 is distributed in whole or in part to the IFCs 46 in order to perform the requisite forwarding functions on incoming packets in parallel. Forwarding information of FIB 52 associates network destinations with specific next-hops and corresponding interface ports. Forwarding plane 44 also includes forwarding engine 50, which processes packets in accordance with FIB 52.

In general, when PE router 40 receives a packet via one of IFCs 46, e.g., IFC 46A, IFC 46A passes the packet to forwarding engine 50, including an indication of a port on which IFC 46A received the packet. Forwarding engine 50 inspects the packet to determine a destination of the packet, e.g., based on header information of the packet that includes an IP address of the destination. In one example, forwarding engine 50 examines the forwarding information stored in FIB 52 and performs a lookup based on the packet's header information.

Management plane 42 includes administrator interface ("ADMIN INTERFACE") 54, and MEP module 56. MEP module 56 represents an exemplary instance of a management endpoint in accordance with the 802.1 ag standard or, more generally, an instance of an OAM protocol executing within control unit 40. That is, MEP module 56 generates CC messages and examines CC messages received from MEPs executing within other network devices, e.g., from MTU 16A.

An operator interacts with administrator interface 54 to direct MEP module 56 to perform CFM operations to discover and manage faults within a network, to issue CC messages to other network devices within a service instance, and to notify other network devices of network path information, including preferred path information, in accordance with the techniques of this disclosure. For example, an administrator may enter commands to view and modify configuration data 62 to automatically generate CC messages at specified times, e.g., once every five seconds or once per minute. The current configuration of PE router 14A is contained within configuration data 62.

MEP module 56 may manage MEP functionality for PE router 40 in its role as a MEP in one or a plurality of service instances. MEP module 56 examines received CC messages and generates and sends CC messages in accordance with configuration data 62, i.e., at configurable intervals and to particular ones of MTUs and PE routers associated with a particular service instance. For example, routing engine 58 may learn of a network status indicating a potential network error within a layer three network, causing MEP module 56 to generate and send CC messages extended with an additional TLV indicating the network status to the particular ones of MTUs and PE routers associated with the particular service instance affected by the network status. In response to learning of the network status, MEP module 56 may further be configured to generate and send CC messages extended with an additional TLV that directs a recipient layer two device, e.g., MTU 16A, to flush a set of MAC addresses specified in the TLV from the set of learned MAC addresses stored within MTU 16A. MEP module 56 may generate a single CC message extended to include both the TLV indicating the network status and the TLV directing the MTU to flush the set of specified MAC addresses or MEP module may generate and send two separate CC messages, one extended to include the network error TLV and a second extended to include the MAC flush TLV.

MEP module 56 may receive a CC message from an MTU, e.g., MTU 16A, that is extended to include a TLV indicating that PE router 40 is within the preferred network path. Upon determining that the received CC message includes the preferred path TLV, PE router 40 is configured to reserve the resources required to process the packets associated with the service instance identified in the CC message. After reserving the required resources, MEP module 56 may receive a CC message corresponding to the same service instance, but that does not include the preferred path TLV. While PE router 40 continues to receive CC messages indicating that PE router 40 is within the preferred network path, PE router 40 is configured to continue to allocate the previously reserved network resources to processing the packets associated with the service instance. Upon receiving the CC message without the preferred path TLV, PE router 40 is configured to adjust how it is allocating resources by, for example, releasing the previously reserved resources to process other packets associated with other service instances.

Routing plane 43 includes routing engine 58 and routing information base ("RIB") 64. Routing engine 58 may comprise any suitable combination of hardware and software, which performs the routing functions of PE router 14A, such as calculating packet routes and executing routing protocols 60 to maintain routing tables. Routing engine 58 maintains routing information in RIB 64 that describes the topology of a network and, in particular, routes through the network. RIB 64 may include, for example, route data that describes various routes within the network, and corresponding next-hop data indicating appropriate neighboring devices within the network for each of the routes.

Routing plane 43 provides an operating environment for executing routing protocols 60. Routing protocols 60 typically establish peer communication sessions with other routing devices to exchange routing information stored in RIB 64, thereby learning the topology of the network and, more specifically, routes to other network devices within the network, e.g., CD 18B. Routing protocols 60 may include exterior routing protocols, such as exterior BGP (eBGP), to exchange routing information with routers of other routing domains or autonomous systems. Additionally, or alternatively, routing protocols 60 may include interior routing protocols, such as interior BGP (iBGP), Routing Information Protocol (RIP), Interior Gateway Routing Protocol (IGRP), Open Shortest Path First (OSPF), or Intermediate System to Intermediate System (IS-IS), to learn of routes to destinations within the same routing domain or autonomous system as PE router 40.

Routing engine 58 further generates forwarding information that associates destination information, such as IP address prefixes, with specific forwarding next-hops and corresponding interfaces ports of IFCs 46, and provides the forwarding information to forwarding plane 44. The forwarding information is determined based on the information stored in RIB 64 as well as configuration information stored configuration data 62. The configuration information of configuration data 62 includes information such as maintenance domain information, maintenance association information, and CC message generation intervals. Forwarding information is stored in FIB 52. RIB 64, configuration data 62, and FIB 52 may be stored in the form of one or more tables, databases, linked lists, radix trees, or other suitable data structure.

Figure 4:
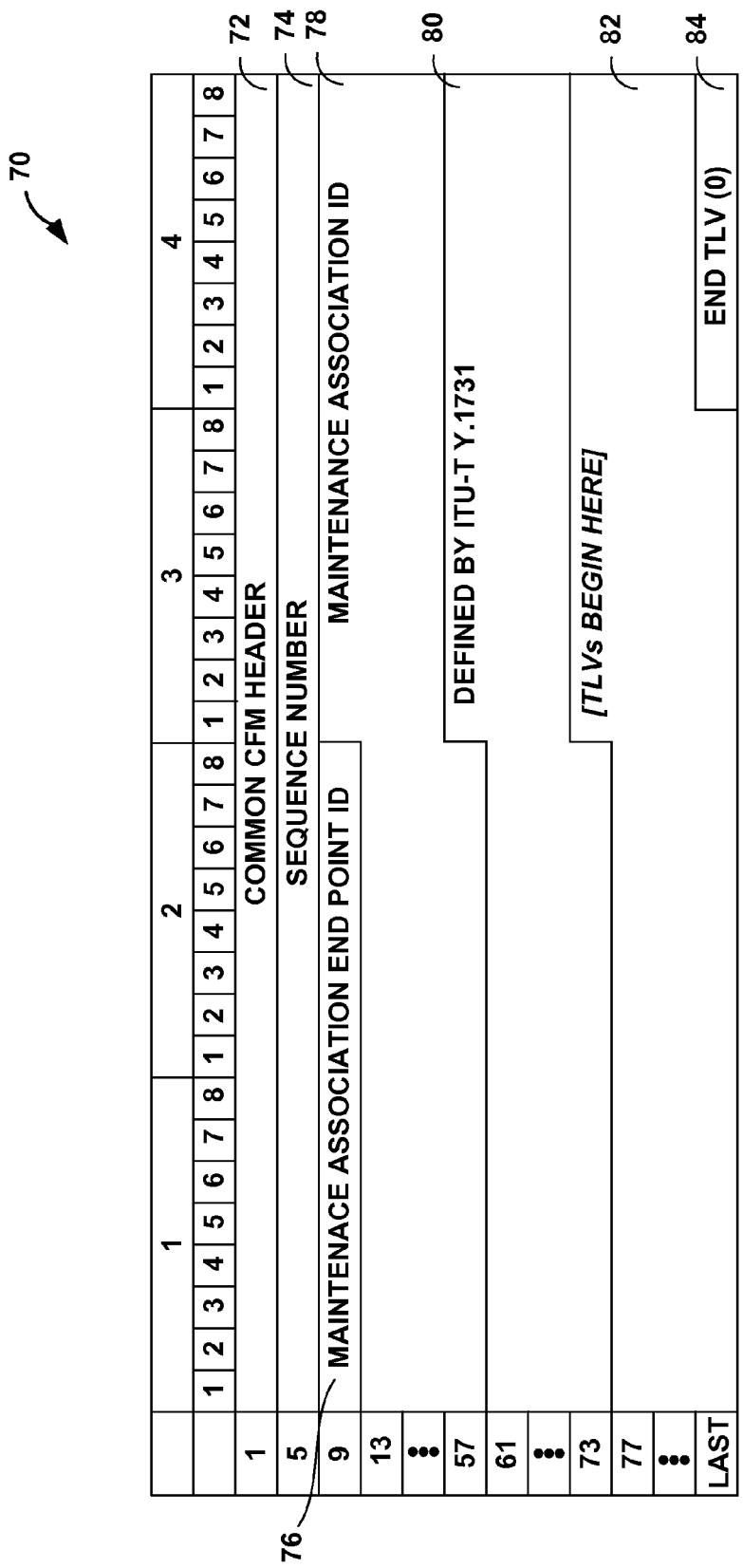
FIG. 4 is a block diagram illustrating an example continuity check (CC) message protocol data unit (PDU) format configured to carry information that can be used to communicate network errors and network path information.

FIG. 4 is an example continuity check (CC) message protocol data unit (PDU) 70 consistent with this disclosure. CC message PDU 70 includes common Connectivity Fault Management (CFM) header 72, sequence number field 74, maintenance association end point identifier ("MAEP ID") 76, maintenance association ID ("MA ID") 78, standards-based information 80, a type-length-value ("TLV") field 82, and an end TLV field 84. The common CFM header 72 includes fields that specify the maintenance domain level, version, an OpCode that specifies the format and meaning of the remainder of the PDU, flags that include the CC message interval, the first TLV offset, and an end TLV. Standards-based information 80 includes the $59^{th}$ through $74^{th}$ octets of the CC message PDU, which are defined by International Telecommunications Union—Telecommunications (ITU-T) entitled SERIES Y: GLOBAL INFORMATION INFRASTRUCTURE, INTERNET PROTOCOL ASPECTS AND NEXT-GENERATION NETWORKS, OAM functions and mechanisms for Ethernet based networks, Y.1731, February 2008, the entire content of which is incorporated by reference herein. TLV field 82 is an optional element of CC message PDU 70. TLV field 82 is described further with respect to FIGS. 5A and 5B.

Figure 5A:
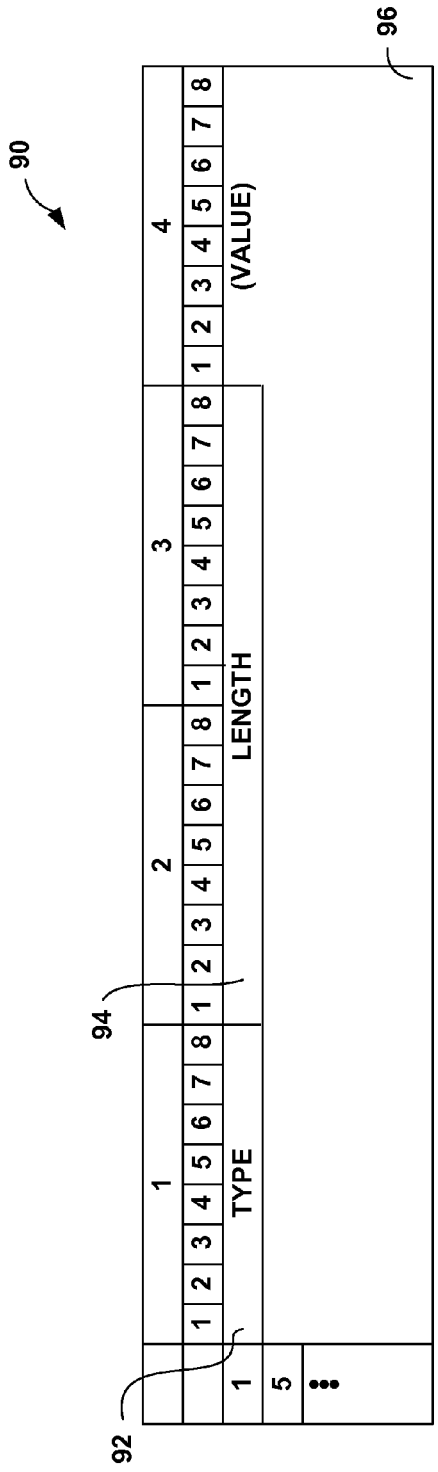
FIGS. 5A and 5B are block diagrams illustrating example formats of a type-length-value (TLV) field that may be included within a CC message PDU.
Figure 5B:
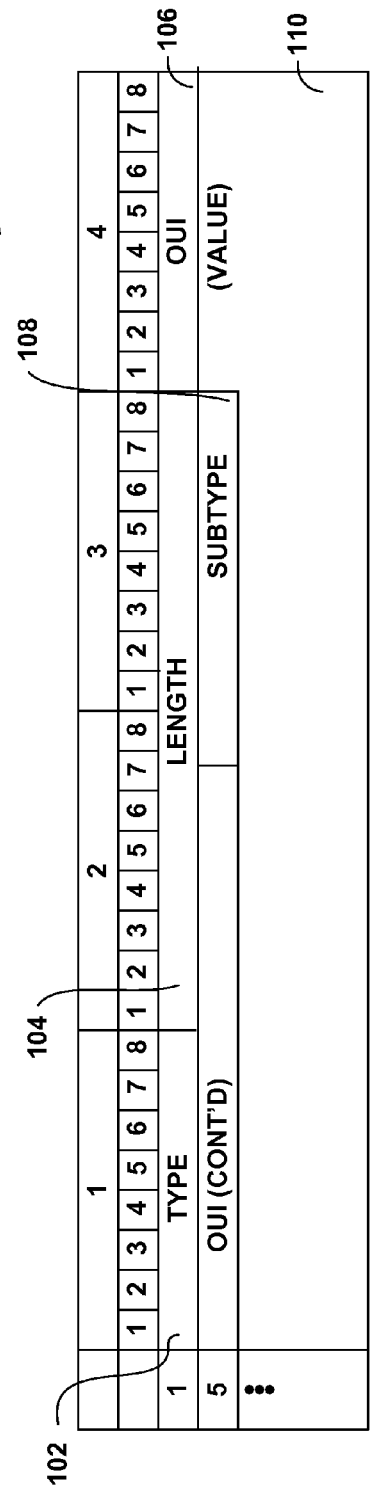

FIGS. 5A and 5B are example formats of a TLV that may be included within a CC message PDU, e.g., CC message PDU 70 of FIG. 4. TLV 90 of FIG. 5A is an example of the format defined by the 802.1ag standard for a TLV having a type that is included in the 802.1ag standard. TLV 90 includes type field 92, length field 94, and value field 96. Type field 92 is a required element of a TLV, which identifies the type of the TLV, and may be a one-octet field. For example, if type field 92 is set to the value one, the TLV is identified as a sender ID TLV. As another example, if type field 92 is set to the value zero, the TLV is identified as an end TLV. When type field 92 is set to the value zero, length field 94 and value field 96 are not present in the TLV. If type field 92 is set to a value other than zero, length field 94 is present and indicates the size of value field 96, in octets. Value field 96 is an optional element that includes the number of octets required to store the information as specified in length field 94. If length field 94 is set to the value zero, value field 96 is not present.

In accordance with this disclosure, the CC message protocol may be extended to include one or more of a preferred network path TLV, a connection status TLV, and a MAC flush TLV. For each of these new TLVs, a corresponding value for type field 92 may be defined to identify the TLV as a preferred network path TLV, a connection status TLV, or a MAC flush TLV. In accordance with this disclosure, MTUs 16, 17 and PE routers 14 operating as MEPs are configured to generate and send or receive and process CC messages consistent with the format illustrated by CC message PDU 70 and TLV 90 to notify other network devices within the MA of preferred network path information, connection status information, and/or to indicate a MAC flush.

As one example, a multi-homing PE such as PE 14A is configured to, upon receiving from an MTU a CC message having a preferred network path TLV, examine the received CC message and determine whether PE 14A is within a preferred network path. In one embodiment, the PE router 14 may determine whether PE router 14A is within the preferred network path based on the value field 96 of a preferred network path TLV of the received CC message. In another embodiment, the PE router 14 may determine whether it is on a preferred network path based simply upon the presence or absence of a preferred network path TLV in the CC message.

In one example, if MTU 16A identifies a network path that includes PE router 14A as a preferred network path, MEP module 26 of MTU 16A generates a CC message that includes a CC message PDU, e.g., CC message PDU 70, that includes a TLV 90 where type field 92 is set to the value that identifies the TLV as a preferred network path TLV. For example, the type field 92 identifying the TLV as a preferred network path TLV may be the value nine, and length field 94 may be set to the value one because only one octet is required to include the preferred network path information, and value field 96 is set to the value one, where the value one indicates to PE router 14A that PE router 14A is included in the preferred network path. Continuing the example, MEP module 26 of MTU 16A may generates a second CC message to send to PE router 14B. The second CC message includes a TLV with type field 92 set to the value that identifies the TLV as a preferred network path TLV (e.g., nine), length field 94 is set to the value one, and value field 96 is set to the value zero, where the value zero indicates to PE router 14B that PE router 14B is not included in the preferred network path.

In another example, MTU 16A identifies a preferred network path that includes PE router 14A and does not include PE router 14B. In this example, MEP module 26 generates a CC message to send to PE router 14A that includes a preferred network path TLV. The preferred network path TLV includes type field 92 set to the value that identifies the TLV as a preferred path TLV and length field 94 set to the value zero, but does not include value field 96. In this example, MEP module 26 generates a CC message to send to PE router 14B that does not include a preferred network path TLV. After receiving the CC message that includes the preferred network path TLV, PE router 14A reserves the resources required to process the packets associated with the service instance specified in the CC message. In contrast, PE router 14B releases any resources previously reserved resources after receiving the CC message that does not include the preferred network path TLV.

In other aspects, PE routers 14 that operate as MEPs may generate CC messages with connection status TLVs and/or MAC flush TLVs. An example TLV 90 corresponding to a connection status TLV includes type field 92 set to the value identifying the TLV as a connection status TLV, e.g., the value ten, length field 94 set to the length of contents of value field 96, in octets, e.g., the value one, and value field 96 set to a value that indicates the connection status of the core segment, e.g., network 10. For example, value field 96 set to the value one indicates that the core segment is forwarding packets. As another example, value field 96 set to the value two indicates that the core segment is not forwarding packets. As another example, value field 96 set to the value four indicates that the core segment is in a standby state. As yet another example, value field 96 set to the value eight indicates that there is a remote Ethernet segment fault.

An example TLV 90 corresponding to a MAC flush TLV includes type field 92 set to the value identifying the TLV as a MAC flush TLV, e.g., the value eleven, length field 94 set to the length of value field 96, in octets, and value field 96 set to various values that indicate which MAC addresses to flush. For example, value field 96 is set to the value zero indicates to the receiving network device to flush all MAC addresses learned over the link on which the CC message is received. Value field 96 may also be set to values corresponding to particular VLAN IDs or I-SIDs (Service Instance VLAN IDs). When value field 96 is set to the value of a particular VLAN ID or I-SID, the network device receiving the CC message, e.g., MTU 16A, flushes the MAC addresses associated with the VLAN ID or I-SID. Value field 96 may also be set to the value of a particular MAC address to indicate that the specified MAC address is to be flushed.

In some aspects, a preferred network path TLV, a connection status TLV, or a MAC flush TLV may be defined as organization-specific TLVs. Referring to FIG. 5B, TLV 100 is an example of an organization-specific TLV 100. Organization-specific TLV 100 includes type field 102, length field 104, and value field 110, similar to these fields described above with respect to TLV 90. For organization-specific TLVs, type field 102 is set to the value thirty-one. Organization-specific TLV 100 also includes organizational unique identifier ("OUI") field 106 and subtype field 108. Length field 104 is set to the total length, in octets, of OUI field 106, subtype field 108, and value field 110. OUI field 106 includes a unique identifier assigned to each organization by the IEEE. Subtype field 108 identifies a type of TLV as defined by the organization identified in OUI field 106. Each organization may identify one or more TLV subtypes. The combination of OUI field 106 and subtype field 108 uniquely identifies the type of the TLV.

MTUs 16, 17 and PE routers 14 may generate the preferred network path, connection status, and MAC flush TLVs described with respect to FIG. 5A as organization-specific TLVs, e.g., TLV 100. When generating preferred network path, connection status, and MAC flush TLVs as organization specific TLVs, subtype field 108 is set to a value, determined by the organization identified in OUI field 106, that identifies the organization-specific TLV as a preferred network path TLV, a connection status TLV, or a MAC flush TLV, e.g., one of the values one, two, or three, respectively. The values of value field 110 for each type of TLV may be set to values that indicate inclusion in a preferred network path, a connection status, or which MAC addresses to flush, in a similar manner as described above with respect to TLV 90.

Figure 6:
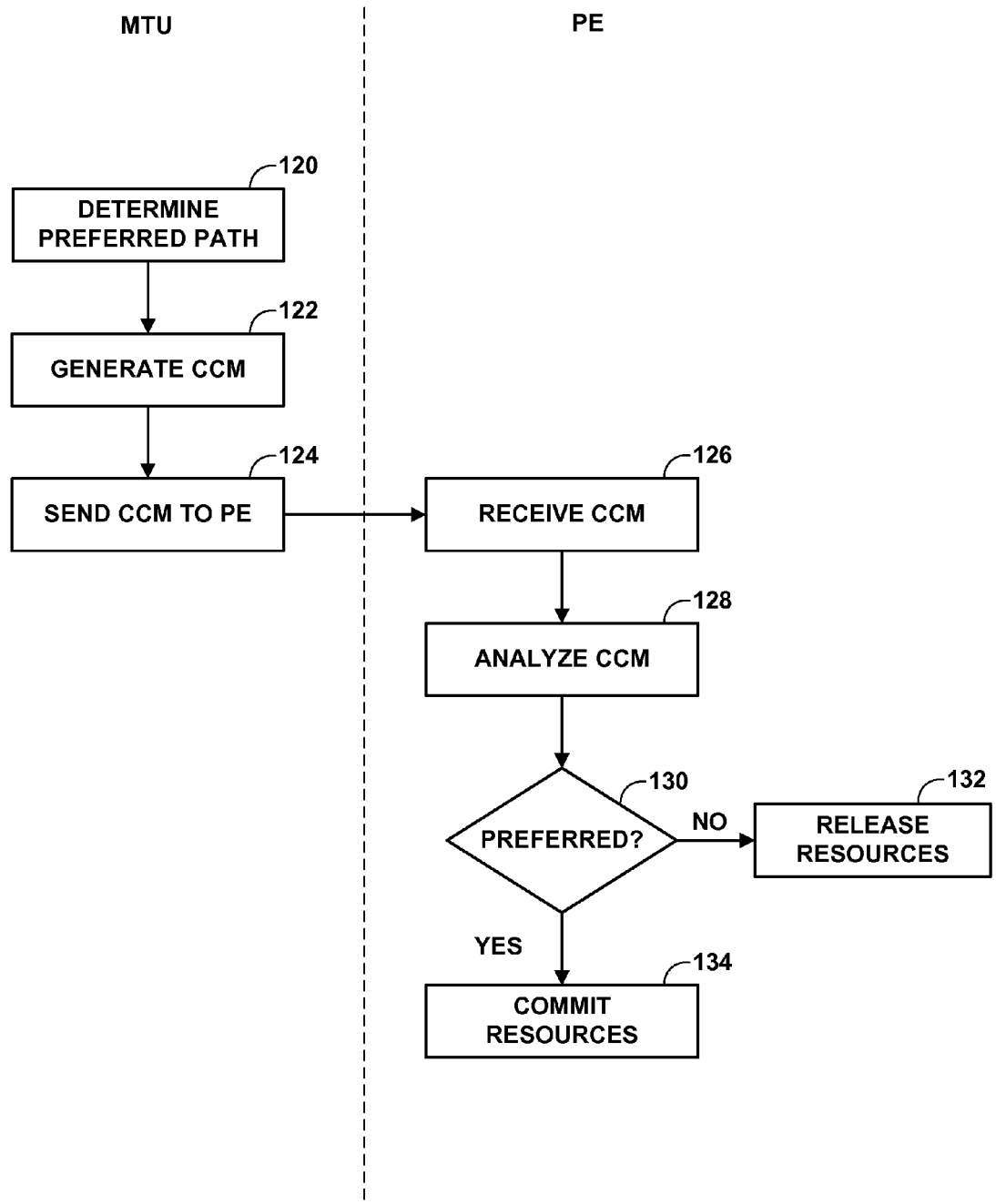
FIG. 6 is a flowchart illustrating an example operation of devices in a network communicating preferred network path information consistent with the techniques described in this disclosure.

FIG. 6 is a flowchart illustrating an example operation of devices in a network communicating preferred path information consistent with the techniques described in this disclosure. For purposes of clarity, FIG. 6 is described with respect to MTU 16A and PE routers 14A and 14B, shown in FIG. 1. MTU 16A determines a preferred network path (120). MTU 16A may determine the preferred network path in any number of ways including, as examples, at random, in response to a network condition such as a network error or network congestion, or based on configuration parameters entered by an administrator. After MTU 16A determines the preferred network path, MEP module 26 of MTU 16A generates a CC message, e.g., including CC message PDU 70 (122). MEP module 26 may be configured to periodically generate CC messages or an administrator may manually cause MEP module 26 to generate a CC message. If MEP module 26 is configured to periodically generate CC messages, in one example, the first CC message generated after MTU 16A determines the preferred network path includes a preferred network path TLV. If an administrator causes MEP module 26 to generate a CC message, the first CC message caused to be generated after MTU 16A determines the preferred network path includes a preferred network path TLV. The preferred network path TLV may be generated in accordance with the example TLVs illustrated by FIGS. 5A and 5B.

In one example, MTU 16A determined that PE router 14A is within the preferred network path and PE router 14B is not within the preferred network path (120). In this example, MEP module 26 generates a CC message indicating that PE router 14A is within the preferred network path (122). MTU 16A then sends the generated CC message to PE router 14A via one of IFCs 22 and outbound links 24 (124). PE router 14A receives the CC message via one of IFCs 46 and inbound links 47 (126) and analyzes the received CC message with MEP module 56 (128). MEP module 56 may be configured to determine if PE router 14A is within the preferred network path based either on the presence or absence of a preferred network path TLV in the CC message or based upon the value of the preferred network path TLV included in the CC message as described with respect to FIGS. 5A and 5B.

If MEP module 56 determines that PE router 14A is not within the preferred network path ("NO" branch of 130), PE router 14A may release various device resources, such as network bandwidth, that were previously reserved for processing packets associated with the service instance of the CC message (132). For example, in response to the determination by MEP module 56 that PE router 14A is not within the preferred path network, MEP module 56 may interact with a protocol executing on control unit 40, such as a resource reservation protocol, to instruct the protocol to effect the release of resources. If MEP module 56 determines that PE router 14A is within the preferred network path ("YES" branch of 130), PE router 14A may commit previously available device resources to processing packets associated with the service instance of the CC message (134).

Where MTU 16A determines that PE router 14B is not within the preferred network path (120), MEP module 26 generates and CC message indicating that PE router 14B is not within the preferred network path (122). MTU 16A then sends the generated CC message to PE router 14B via one of IFCs 22 and outbound links 24 (124). PE router 14B receives the CC message via one of IFCs 46 and inbound links 47 (126) and analyzes the received CC message with MEP module 56 (128). Upon determining that PE router 14B is not within the preferred network path, PE router 14B may reallocate resources. As one example, PE router 14B may elect not to reserve free device resources for processing packets associated with the service instance of the CC message. As another example, PE router 14B may release various device resources, such as network bandwidth, that were previously reserved for processing packets associated with the service instance of the CC message (132).

Figure 7:
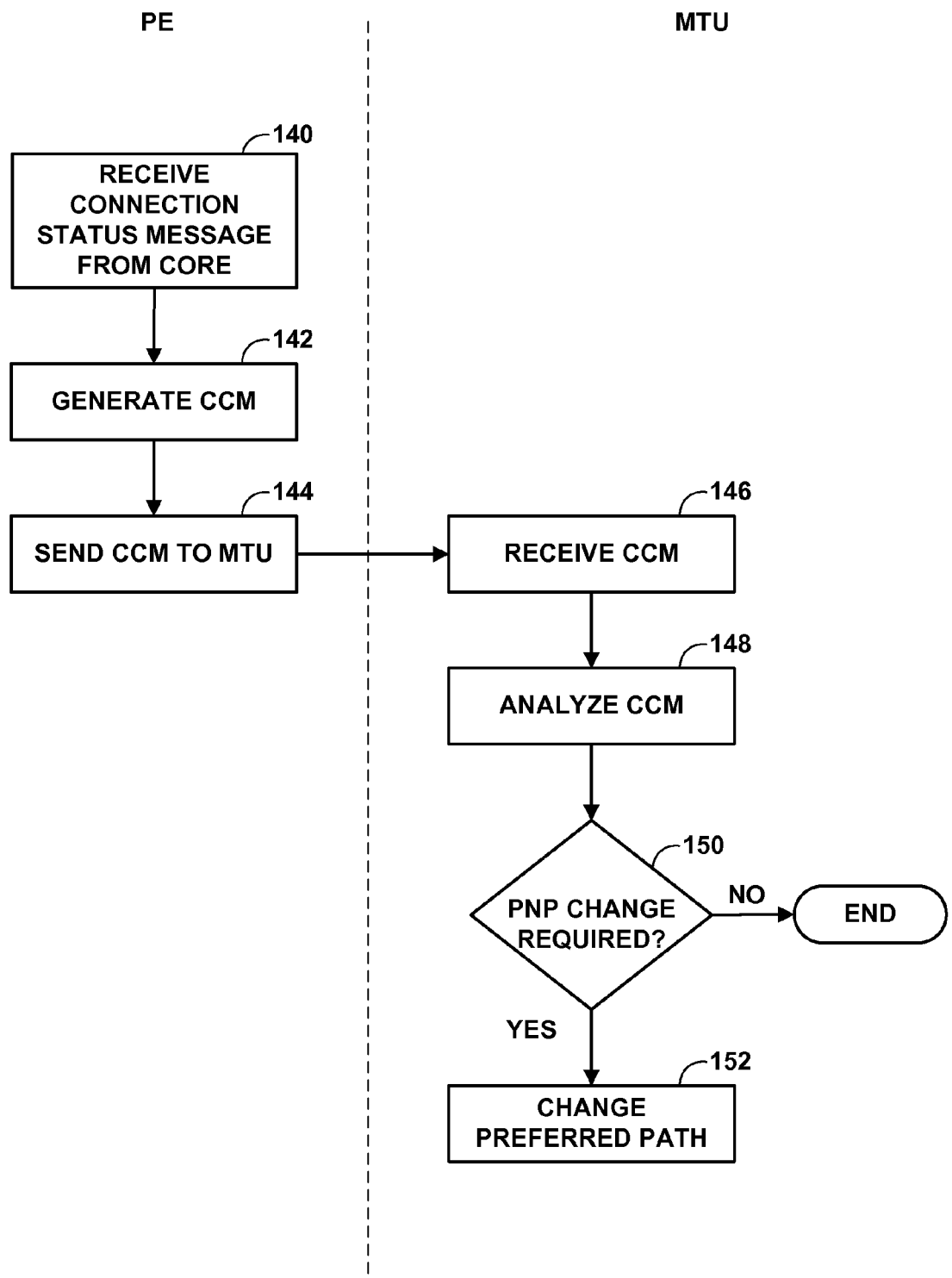
FIG. 7 is a flowchart illustrating an example operation of devices in a network communicating the connection status in a core network consistent with the techniques described in this disclosure.

FIG. 7 is a flowchart illustrating an example operation of layer three (L3) devices operating in an L3 network communicating a network status of the L3 network to layer two (L2) devices operating in an L2 network consistent with the techniques described in this disclosure. For purposes of clarity, FIG. 7 is described with respect to network 10, PE router 14A, and MTU 16A shown in FIG. 1. PE router 14A receives L3 connection status messages about network 10 using a L3 protocol, e.g., a routing protocol such as BGP or LDP (140) and in response, MEP module 56 of PE router 14A generates a L2 message, e.g., a CC message frame that includes a connection status TLV (142). PE router 14A communicates the connection status of network 10 to MTU 16A using CC message TLVs as described with respect to FIGS. 5A and 5B. MEP module 56 of PE router 14A may be configured to generate connection status TLVs upon any change in connection status or with each CC message generated by MEP module 56, for example. PE router 14A then sends the CC message to MTU 16A (144) and MTU 16A receives the CC message (146).

MEP module 26 of MTU 16A analyzes the received CC message (148) to determine the connection status of network 10, e.g., a network error or a restoration of connectivity. MEP module 26 determines the connection status based on the value of the connection status TLV included in the received CC message. For example, if the value of the connection status TLV is two, MEP module 26 determines the core network, e.g., network 10, is not forwarding traffic. As another example, if the value of the connection status TLV is four, MEP module 26 determines that network 10 is in a standby state.

Based on the analysis of the CC message (148), MTU 16A may determine if a previously determined preferred network path needs to be changed (150). For example, if the connection status TLV indicates that network 10 is not forwarding, MTU 16A may determine that the preferred network path needs to be changed in order to route around the portion of network 10 that is not forwarding ("YES" branch of 150). In another example, the connection status TLV indicates that network 10 is forwarding. If PE router 14A was already in the preferred network path, MTU 16A may determine that the preferred network path does not need to be changed ("NO" branch of 150). MTU 16A may also determine that the preferred network path does not need to be changed ("NO" branch of 150) if, for example, a connection status TLV indicating a network error, e.g., a remote Ethernet segment fault or network 10 not forwarding, is generated by a PE router 14 not currently within the preferred network path.

MTU 16A changes the preferred network path (152) by modifying the CC messages generated and set to PE routers 14A, 14B. If, for example, PE router 14A was in the preferred network path, but is no longer within the preferred network path based on the analysis of the CC message received from PE router 14A (148), MEP module 26 of MTU 16A stops generating and sending CC messages with preferred network path TLVs to PE router 14A indicating that PE router 14A is within the preferred network path and, instead, generates and sends CC messages to PE router 14A indicating that PE router 14A is no longer within the preferred network path. If PE router 14B is within the new preferred path, MEP module 26 stops generating and sending CC messages to PE router 14B indicating that PE router 14B is not within the preferred network path and, instead, generates and sends CC messages to PE router 14B indicating that PE router 14B is within the preferred network path. The format CC messages and TLVs indicating to PE routers 14A, 14B whether or not each of PE routers 14A, 14B is within the preferred network path is described with respect to FIGS. 5A and 5B.

Figure 8:
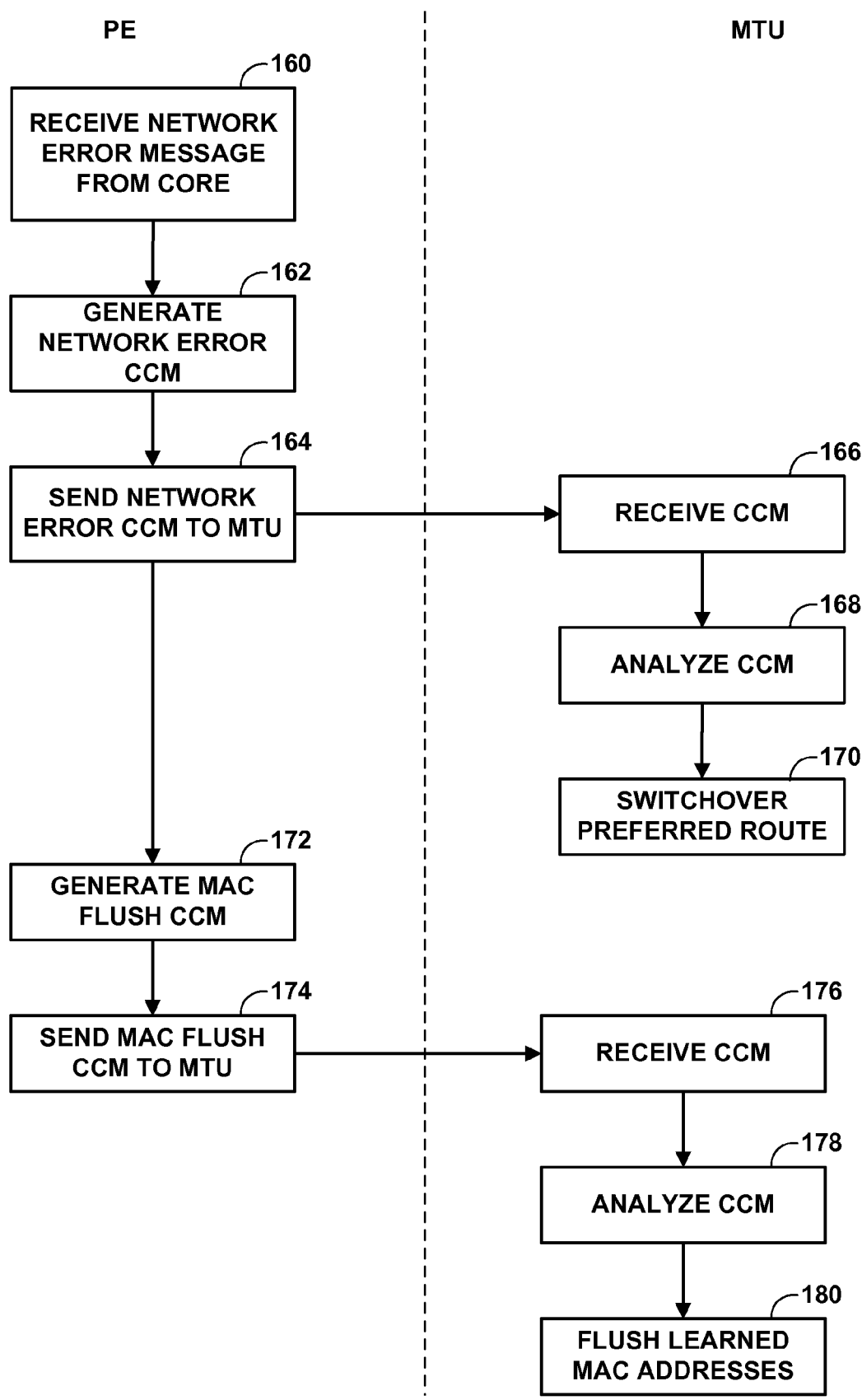
FIG. 8 is a flowchart illustrating an example operation of devices in a network communicating a network error in a core network and a resulting MAC flush consistent with the techniques described in this disclosure.

FIG. 8 is a flowchart illustrating an example operation of PE routers 14 and MTUs 16, 17 communicating a particular network status in network 10 and a MAC flush consistent with the techniques described in this disclosure. For purposes of clarity, the method shown in FIG. 6 will be described with respect to network 10, PE router 14A, and MTU 16A shown in FIG. 1. PE router 14A receives a connection status message via a routing protocol, such as BGP or LDP, indicating an error in network 10 (160). A network error may result from a portion of network 10 not forwarding packets because a link is down or because the portion of network 10 is in a standby state, or because of a remote Ethernet segment faults, as examples. PE router 14A generates a CC message that includes a connection status TLV indicating the network error (162) and send the CC message to MTU 16A (164). MTU 16A receives the CC message (166), analyzes the received CC message (168), and determines that the received CC message includes a connection status TLV that indicates an error in network 10. Based on the network error, MTU 16A determines that the preferred network path needs to be changed and MEP module 26 of MTU 16A generates and sends CC messages to PE routers 14A and 14B indicating the change in preferred network path as previously described (170).

After generating and sending the CC message indicating the network error, PE router 14A generates another CC message to indicate the set of MAC addresses MTU 16A should flush from the learned MAC addresses (172). If the error in network 10 is limited to a particular MAC address, VLAN ID, or I-SID, MEP module 56 generates the MAC flush TLV to indicate the particular MAC address, or the set of MAC addresses associated with the VLAN ID or I-SID that are to be flushed. If the error in network 10 effects all network devices connected to the link, MEP module 56 may generate the MAC flush TLV to indicate that all of the MAC addresses learned over the link are to be flushed. After generating the MAC flush CC message, PE router 14A sends the MAC flush CC message to MTU 16A (174). MTU 16A receives the CC message (176) and analyzes the received CC message (178). MEP module 26 of MTU 16A determines which MAC addresses need to be flushed from MAC data 32 based upon the value of the MAC flush TLV and flushes the corresponding MAC addresses from MAC data 32 (180).

The methods illustrated in FIGS. 6-8 may be implemented in combination or individually. Further, multiple steps may be combined into a single step. For example, PE router 14A may generate and send a single CC message to MTU 16A that includes both a connection status TLV and a MAC flush TLV. MEP module 26 of MTU 16A is capable of processing both the connection status TLV and the MAC flush TLV and changing the preferred network path based on the single CC message. While discussed with respect to PE routers 14A, 14B and MTU 16A, any PE or MTU configured in accordance with the techniques of this disclosure may implement the methods illustrated in FIGS. 6-8.

In this manner, connection status information, preferred network path information, and MAC flush information may be communicated between L2 and L3 devices using a periodic L2 frame, e.g., an Ethernet OAM frame. The techniques of this disclosure may reduce any loss of network packets for services otherwise not affected by a network error, but operating over the same link as packets affected by the network error. Further, the techniques of this disclosure may more efficiently utilize the available network resources.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various embodiments of the invention have been described. These and other embodiments are within the scope of the following claims.

The invention claimed is:

1. A method comprising:
learning, with a layer two (L2) device, a set of remote media access control (MAC) addresses reachable over a network link connecting the L2 device to a layer three (L3) device;
storing, with the L2 device, the learned set of remote MAC addresses within the L2 device;
receiving, with the L2 device and from the L3 device, an L2 frame issued by an operations, administration, and management (OAM) protocol executing on the L3 device, wherein the L2 frame carries a first type-length-value (TLV) field that indicates a portion of the learned set of MAC addresses to remove and directs the L2 device to remove the portion of the learned set of MAC addresses from the learned set of MAC addresses stored within the L2 device and a second TLV field that indicates a network error, wherein the portion of the learned set of MAC addresses include MAC addresses impacted by the network error, and wherein the L2 frame is a continuity check message used by the OAM protocol executing on the L3 device to detect connectivity failures between a sending device and a destination device; and
in response to receiving the L2 frame from the L3 device, removing, with the L2 device, the portion of the learned set of MAC addresses indicated by the L2 frame from the learned set of MAC addresses stored within the L2 device.

2. The method of claim 1,
wherein the first TLV field specifies a VLAN identifier, and
wherein removing the portion of the learned set of MAC addresses specified in the L2 frame comprises the L2 device flushing MAC addresses associated with the VLAN identifier from the learned set of MAC addresses.

3. The method of claim 1,
wherein the first TLV field specifies a service instance VLAN identifier (I-SID), and
wherein removing the portion of the learned set of MAC addresses specified in the L2 frame comprises the L2 device flushing MAC addresses associated with the I-SID from the learned set of MAC addresses.

4. The method of claim 1, wherein the first TLV field specifies a single MAC address, and wherein the L2 device flushes the single MAC address from the learned set of MAC addresses.

5. The method of claim 1, wherein the OAM protocol executing on the L3 device operates in accordance with an 802.1ag standard.

6. The method of claim 1, wherein the L2 device is a network switch, and wherein the L3 device is a router.

7. A network system comprising:
a layer three (L3) device comprising:
a plurality of physical network interfaces configured to send and receive network data; and
a control unit, wherein the control unit comprises:
a management endpoint (MEP) module configured to execute an operations, administration, and management (OAM) protocol to monitor a first L2 network, and
a layer two (L2) device comprising:
a plurality of physical network interfaces configured to send and receive network data;
a media access control (MAC) address repository configured to store a set of addresses learned over a network link coupled to one of the plurality of physical network interfaces of the L2 device;
a control unit configured to learn the set of MAC addresses reachable over the network link, and store the learned set of network devices in the MAC address repository, wherein the network link connects the L2 device to the L3 device, and wherein the control unit comprises:
a management endpoint (MEP) module configured to receive an L2 frame issued by the OAM protocol executing on the MEP module of the L3 device, remove a portion of the learned set of MAC addresses indicated by the L2 frame from the learned set of MAC addresses stored within the L2 device, wherein the L2 frame carries a first type-length-value (TLV) field that indicates the portion of the learned set of MAC addresses to remove and directs the L2 device to remove the portion of the learned set of MAC addresses from the learned set of MAC addresses stored within the L2 device and a second TLV field that indicates a network error, wherein the portion of the learned set of MAC addresses include MAC addresses impacted by the network error, and wherein the L2 frame is a continuity check message used by the OAM protocol executing on the MEP module of the L3 device to detect connectivity failures between a sending device and a destination device.

8. The network system of claim 7,
wherein the first TLV field specifies a VLAN identifier, and
wherein the MEP module of the L2 device is configured to remove the portion of the learned set of MAC addresses specified in the L2 frame by at least being configured to flush MAC addresses associated with the VLAN identifier from the MAC addresses repository.

9. The network system of claim 7,
wherein the first TLV field specifies a service instance VLAN identifier (I-SID), and
wherein the MEP module of the L2 device is configured to remove the portion of the learned set of MAC addresses specified in the L2 frame by at least being configured to flush MAC addresses associated with the I-SID from the MAC addresses repository.

10. The network system of claim 7,
wherein the first TLV field specifies a single MAC address, and
wherein the MEP module of the L2 device is configured to remove the subset of MAC addresses specified in the L2 frame by at least being configured to flush the single MAC address from the MAC addresses repository.

11. A computer-readable storage medium encoded with instructions for causing one or more programmable processors of a layer two (L2) device to:
learn a set of remote media access control (MAC) addresses reachable over a network link connecting the L2 device to a layer three (L3) device;
store the learned set of remote MAC addresses within the L2 device;
receive, from the L3 device, an L2 frame issued by an operations, administration, and management (OAM) protocol executing on the L3 device; and
in response to receiving the L2 frame from the L3 device, remove a portion of the learned set of MAC addresses indicated by the L2 frame from the learned set of MAC addresses stored within the L2 device, wherein the L2 frame carries a first type-length-value (TLV) that indicates the portion of the learned set of MAC addresses to remove and directs the L2 device to remove the portion of the learned set of MAC addresses from the learned set of MAC addresses stored within the L2 device and a second TLV field that indicates a network error, wherein portion of the learned set of MAC addresses include MAC addresses impacted by the network error, and wherein the L2 frame is a continuity check message used by the OAM protocol executing on the L3 device to detect connectivity failures between a sending device and a destination device.

12. A layer two (L2) device comprising:
a plurality of physical network interfaces for sending and receiving data frames; and
a control unit configured to learn a set of MAC addresses reachable over a network link, wherein the control unit comprises:
a media access control (MAC) address repository configured to store the learned set of MAC addresses, wherein the network link connects the L2 device to a layer three (L3) device, and
a management endpoint (MEP) module configured to receive, from the L3 device, an L2 frame issued by an operations, administration, and management (OAM) protocol executing on the L3 device, remove a portion of the learned set of MAC addresses indicated by the L2 frame from the learned set of MAC addresses stored within the L2 device, wherein the L2 frame carries a first type-length-value (TLV) field that indicates the portion of the learned set of MAC addresses to remove and directs the L2 device to remove the portion of the learned set of MAC addresses from the MAC address repository and a second TLV field that indicates a network error, wherein the portion of the learned set of MAC addresses include MAC addresses impacted by the network error, and wherein the L2 frame is a continuity check message used by the OAM protocol executing on the MEP module of the L3 device to detect connectivity failures between a sending device and a destination device.

13. The L2 device of claim 12,
wherein the first TLV field specifies a VLAN identifier, and
wherein the MEP module is configured to remove the portion of the learned set of MAC addresses specified in the L2 frame by at least being configured to flush MAC addresses associated with the VLAN identifier from the MAC addresses repository.

14. The L2 device of claim 12,
wherein the first TLV field specifies a service instance VLAN identifier (I-SID), and
wherein the MEP module is configured to remove the portion of the learned set of MAC addresses specified in the L2 frame by at least being configured to flush MAC addresses associated with the I-SID from the MAC addresses repository.

15. The L2 device of claim 12,
wherein the first TLV field specifies a single MAC address, and
wherein the MEP module is configured to remove the portion of the learned set of MAC addresses specified in the L2 frame by at least being configured to flush the single MAC address from the MAC addresses repository.

16. The L2 device of claim 12, wherein the L2 device is a network switch, and wherein the L3 device is a router.

* * * * *